(12) United States Patent
Yamada et al.

(10) Patent No.: US 6,422,201 B1
(45) Date of Patent: Jul. 23, 2002

(54) INTAKE CONTROL SYSTEM FOR ENGINE

(75) Inventors: Hajime Yamada; Hirosi Nakagome; Tetsuya Nakayasu; Akihiro Hamada, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 33 days.

(21) Appl. No.: 09/654,032

(22) Filed: Sep. 1, 2000

(30) Foreign Application Priority Data

Sep. 2, 1999 (JP) ............................................. 11-249040

(51) Int. Cl.⁷ .......................... F02M 35/10; B60K 13/02
(52) U.S. Cl. .............. 123/336; 123/184.53; 123/198 E; 180/68.3
(58) Field of Search ................................ 123/336, 59.5, 123/580, 198 E, 184.53; 180/68.3

(56) References Cited

U.S. PATENT DOCUMENTS

| | | | | |
|---|---|---|---|---|
| 3,877,908 A | * | 4/1975 | Phelps et al. | 55/419 |
| 4,821,685 A | * | 4/1989 | Matsushima et al. | 123/184.53 |
| 4,890,586 A | | 1/1990 | Fujji et al. | 123/184.55 |
| 5,307,771 A | * | 5/1994 | Stahel, II et al. | 123/198 E |

FOREIGN PATENT DOCUMENTS

| | | | |
|---|---|---|---|
| EP | 0 382 596 | 8/1990 | |
| JP | A58155270 | 9/1983 | |
| JP | 3-290052 | * 12/1991 | ............. 123/198 E |

OTHER PUBLICATIONS

Patent Abstracts of Japan, Jun. 23, 1989, vol. 13, No. 274 (M–841) (abstract of JP 01 073115 A).
Patent Abstracts of Japan, Sep. 13, 1994, vol. 18, No. 491 (M–1672) (abstract of JP 06 159072 A).
Patent Abstracts of Japan, Mar. 31, 1992, vol. 16, No. 127 (M–1227) (abstract of JP 03 290052 A).
Patent Abstracts of Japan, Sep. 23, 2000, vol. 2000, No. 6 (abstract of JP 2000 064919 A).

* cited by examiner

Primary Examiner—Andrew M. Dolinar
(74) Attorney, Agent, or Firm—Birch, Stewart, Kolasch & Stewart, LLP (57) ABSTRACT

A plurality of passages disposed in parallel are formed in an air cleaner interposed in an intake system of an engine. An intake control valve for opening/closing the a passage having a large cross-sectional area is provided in the air cleaner. An actuator for closing the intake control valve in a low speed rotational range of the engine and opening the intake control valve in a high speed rotational range of the engine is connected to the intake control valve.

17 Claims, 13 Drawing Sheets

INTAKE CONTROL SYSTEM FOR ENGINE

BACKGROUND OF THE INVENTION

1. Field of the Invention

The present invention relates to an intake control system for an engine that achieves improved output performance over low and high speed rotational ranges.

2. Background Art

A conventional intake control system, in which a relief valve automatically opens in response to a differential pressure across upstream and downstream sides of the relief valve, is used to prevent excessively lean air/fuel ratios. This type of device is shown in Japanese Patent Laid-open No. Sho 58-155270.

In such an intake control system, when the engine is rapidly accelerated in response to the rapid opening of a throttle valve, an intake air amount is restricted by a small air hole provided on the relief valve. The relief valve is used to suppress the leaning of the air-fuel ratio of a mixture prior to entering the combustion chamber, thereby achieving improved acceleration performance.

The relief valve of the conventional system prevents rapid inflows of intake air by restricting air intake at the air inlet to the air cleaner. The relief valve automatically opens when a differential pressure across the upstream and downstream sides of the relief valve exceeds a specific value. In a high speed rotational range, the relief valve is opened due to the increase in the air intake amount over the specific value.

However, the above-described prior art system demonstrates the following shortcoming. The conventional system utilizes a relief valve that is biased by a spring force in the valve closing direction. The spring force acts as the air intake resistance that restricts the opening of the relief valve.

SUMMARY OF THE INVENTION

The present invention overcomes the shortcomings associated with the prior art and achieves other advantages not realized by the prior art.

An object of the present invention is to provide an intake control system for an engine which is capable of reducing air intake resistance in a high speed rotational range of the engine and thereby improves the output performance of the engine.

A further object of the present invention is to provide an intake control system for an engine which is capable of reducing air intake resisistance in a high speed rotational range, while still preventing the leaning of air/fuel ratios of a mixture while operating in a low speed rotational range.

A further object of the present invention is to use a spring force and air intake pressure to bias an air intake valve in the closed position.

These and other objects are accomplished by an intake control system for an engine comprising: a plurality of passages disposed in parallel and formed in an air cleaner; an intake control valve for opening/closing at least one passage of said plurality of passages is provided in said air cleaner; and an actuator for closing said intake control valve in a low speed rotational range of said engine and opening said intake control valve in a high speed rotational range of said engine is connected to said intake control valve.

These and other objects are further accomplished by an intake control system for an engine comprising: an air cleaner; a plurality of throttle bodies each having an intake passage; a plurality of air funnels for connecting to the intake passages of the throttle bodies; a cleaner case including a lower case half and an upper case half; an element mounting plate for partitioning an inside of the cleaner case into a lower side dirty air chamber and an upper side clean air chamber; a cleaner air element mounted in a mounting hole provided in the element mounting plate; a partition wall for partitioning the lower side dirty air chamber into a plurality of passages disposed in parallel and formed in an air cleaner; and an intake control valve for opening/closing at least one passage of said plurality of passages is provided in said air cleaner, wherein said intake control valve is closed in a low speed rotational range of said engine and opens in a high speed rotational range of said engine.

These and other objects are also accomplished by an engine for mounting on a motorcycle, said engine comprising: an electronic control unit; at least one combustion chamber; a cylinder block; a cylinder head; an exhaust control system; and an intake control system, said intake control system including a throttle body connected to said engine; an air cleaner for cleaning air flowing in an intake passage of said throttle body is disposed on an upper portion of said engine; and said air cleaner includes a cleaner case and a cleaner element for partitioning the inside of said cleaner case into a dirty air chamber in communication with atmospheric air and a clean chamber in communication with said intake passage of said throttle body; said clean chamber disposed in said cleaner case on an upper portion of said dirty air chamber; and an intake control valve for opening and closing at least one passage of said plurality of passages is provided in said cleaner case; a partition wall for partitioning an intermediate portion of said dirty air chamber into a plurality of passages disposed in parallel is provided in said cleaner case; and an actuator for closing said intake control valve in a high speed rotational range of said engine and opening said intake control valve in a high speed rotational range of said engine is connected to said intake control valve; wherein said engine is capable of being mounted on a motorcycle so that said cylinder block and said cylinder head are tilted in a forward direction of the motorcycle.

With the first feature, in the low speed rotational range of the engine, the intake control valve is held, by the actuator, in a state in which at least one of the plurality of passages is closed, so that the amount of an intake air passing through only the other passage is restricted upon rapid opening of the throttle valve. As a result, it is possible to suppress the leaning of an air-fuel mixture sucked in the engine, and hence to achieve a good accelerating performance of the engine.

When the operational state of the engine is shifted to the high speed rotational range, the intake control valve is positively opened by the actuator, so that air sucked in the engine can pass through not only the one passage not obstructed by the intake control valve but also the other passage. As a result, it is possible to effectively reduce the intake resistance and increase the volumetric capacity of the engine, and hence to achieve the high output performance of the engine.

According to a second feature of the present invention, there is provided an intake control system for an engine mounted on a motorcycle in which an engine is mounted on a body frame with a cylinder block and a cylinder head thereof kept in a forward tilting posture; a throttle body is connected to the engine; an air cleaner for cleaning air flowing in an intake passage of the throttle body is disposed on the upper portion of the engine; and the air cleaner includes a cleaner case and a cleaner element for partitioning the inside of the cleaner case into a dirty air chamber communicated to atmospheric air and a clean chamber communicated to the intake passage of the throttle body.

The intake control system is characterized in that the clean chamber is disposed, in the cleaner case, on the upper portion of the dirty air chamber; the intake passage of the throttle body is communicated to the clean chamber; a partition wall for partitioning an intermediate portion of the dirty air chamber into a plurality of passages disposed in parallel is provided to the cleaner case; an intake control valve for opening/closing at least one of the plurality of passages is provided to the cleaner case; and an actuator for closing the intake control valve in a high speed rotational range of the engine and opening the intake control valve in a high speed rotational range of the engine is connected to the intake control valve.

With this second feature, in addition to the improved output performance of the engine like the first feature, since the layout of the components in the cleaner case, i.e. the layout of the plurality of passages, the intake control valve, and the portion communicated to the intake passage of the throttle body, is practical, it is possible to make a more compact air cleaner and to easily position the air cleaner on the upper portion of the engine without limiting engine orientation or mounting positions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative oft he present invention, and wherein.

DETAILED DESCRIPTION OF THE PREFERRED EMBODIMENTS

Figure 1:
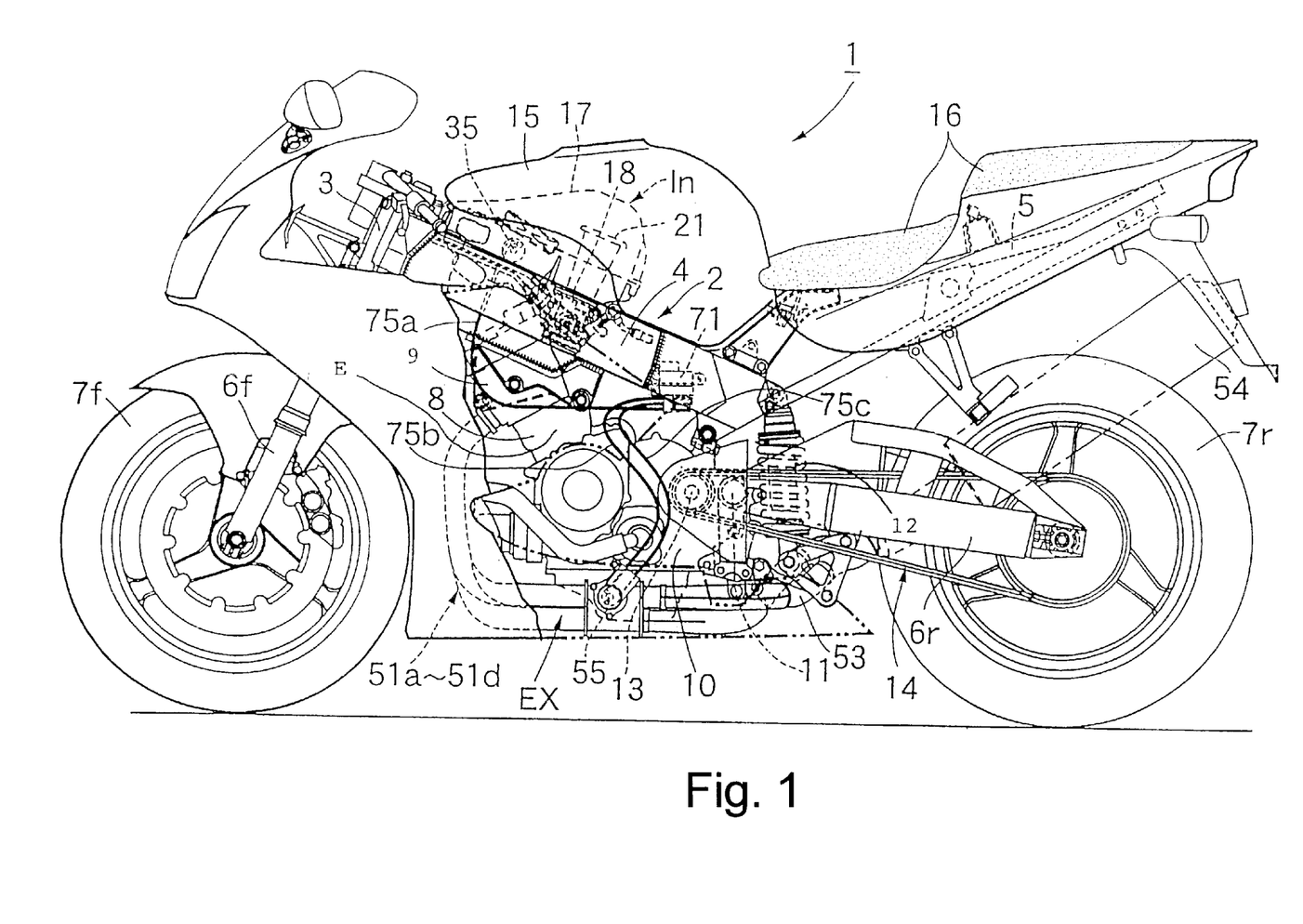
FIG. 1 is a side view of a motorcycle including intake and exhaust control systems for an engine according to the present invention.

FIG. 1 is a side view of a motorcycle including intake and exhaust control systems for an engine according to the present invention. Referring to FIG. 1, a body frame 2 of a motorcycle 1 includes a pair of right and left main frames 4 which have a head pipe 3 at the front ends thereof. The frames 4 extend rearwardly and downwardly therefrom, and are connected to each other at their rear ends thereof. Seat rails 5 are connected to the rear ends of the main frames 4 and extend rearwardly and upwardly therefrom. A parallel four-cylinder engine E is mounted on the pair of main frames 4 in such a manner that a cylinder block 8 and a cylinder head 9 are tilted slightly forwardly and the cylinder head 9 is inserted between the main frames 4.

A front fork 6f for rotatably supporting a front wheel 7f is steerably connected to the head pipe 3. A rear fork 6r for supporting a rear wheel 7r is vertically swingably connected, via a pivot 11, to a rear portion of a crank case 10 of the engine E, and a rear cushion unit 12 is interposed between the rear fork 6r and the main frames 4.

The rear wheel 7r is driven via a chain transmission system 14 by an output shaft 13, disposed in front of the pivot 11, of the engine E. A fuel tank 15 is mounted on the main frames 4, and a tandem main seat 16 is mounted on the seat rails 5.

An intake system In of the engine E including an air cleaner 17 and throttle bodies 18 is disposed over the cylinder head 9 in such a manner as to be covered with the fuel tank 15. An exhaust system Ex of the engine E including exhaust pipes 51a to 51d and an exhaust muffler 54 projects from the front surfaces of the cylinder head 9 and the cylinder block 8, passes under the crank case 10, and extends obliquely and upwardly.

Referring to FIGS. 1 to 6, the intake system In of the engine E will be first described. Referring to FIGS. 1 to 4, four pieces of the throttle bodies 18 corresponding to four cylinders of the engine E are connected to the cylinder head 9 of the engine E. Air funnels 21 are connected to inlets of intake passages 18a of the throttle bodies 18. A cleaner case 22 of the air cleaner 17 is mounted to the four throttle bodies 18 in such a manner as to house all of the air funnels 21. The cleaner case 22 includes a lower case half 22b fixed to the throttle bodies 18, and an upper case half 22a separably connected to the lower case half 22b with a small screw 27.

Figure 2:
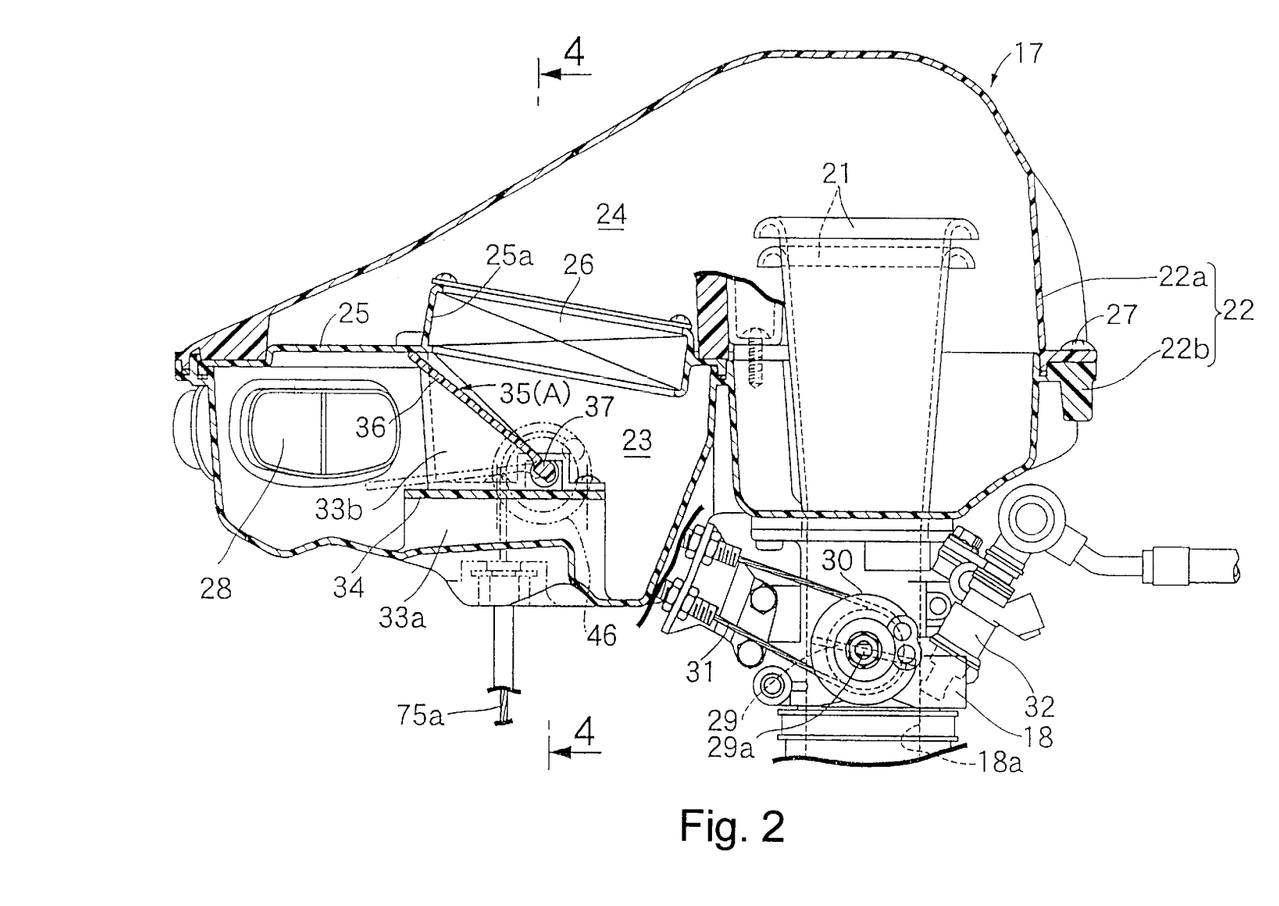
FIG. 2 is a vertical sectional side view showing an essential portion of the intake control system.
Figure 4:
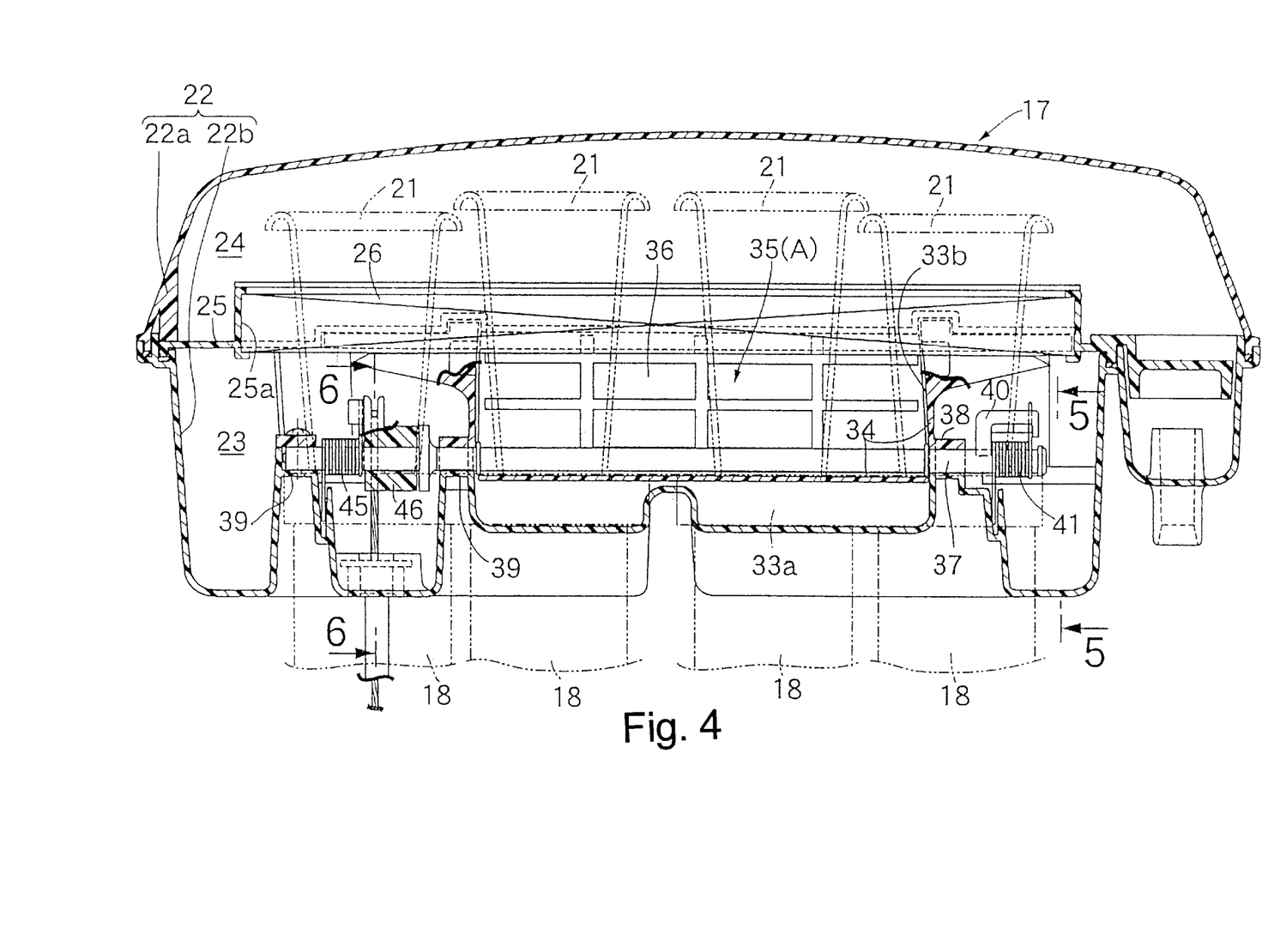
FIG. 4 is a sectional view taken on line 4—4 of FIG. 2.
Figure 5:
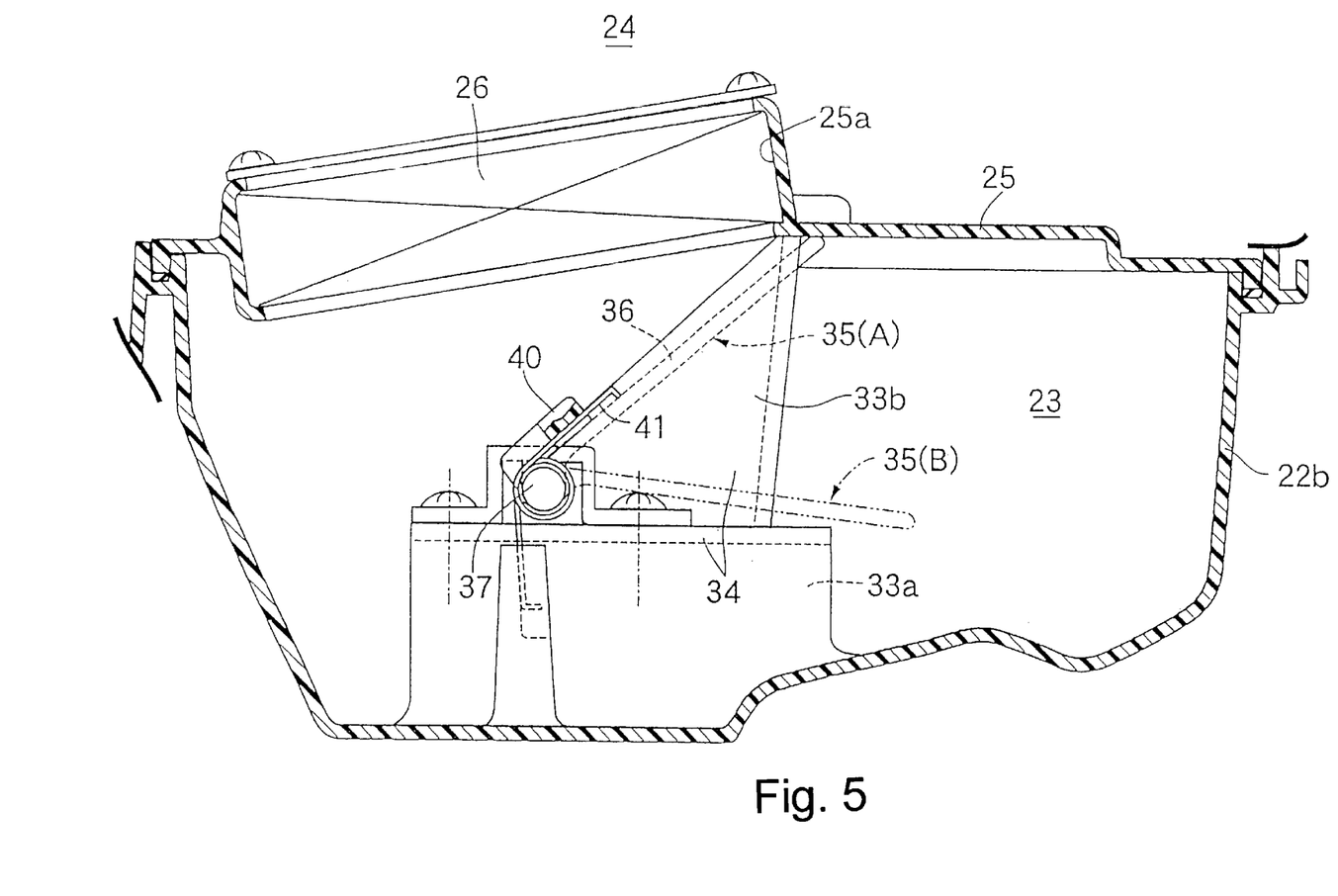
FIG. 5 is a sectional view taken on line 5—5 of FIG. 4.

An element mounting plate 25 for partitioning the inside of the cleaner case 22 into a lower side dirty air chamber 23 and an upper side clean chamber 24 is held between both the case halves 22a and 22b. A cleaner element 26 is mounted in a mounting hole 25a provided in the element mounting plate 25.

An air inlet 28 through which the dirty air chamber 23 is opened to atmospheric air is provided in one side surface of the lower case half 22b. The air funnels 21 pass through a bottom wall of the lower case half 22b, and inlets of the air funnels 21 are opened to the clean chamber 24. Accordingly, during operation of the engine E, air having flowed in the dirty air chamber 23 from the air inlet 28 is filtered by the cleaner element 26 and is supplied in the clean chamber 24. The air supplied in the clean chamber 24 flows in the throttle bodies 18 through the air funnels 21. In each of the throttle bodies 18, the flow rate of the air is adjusted by a throttle valve 29. The air whose flow rate has been adjusted by each throttle body 18 then enters the engine E. At this time, fuel is injected from a fuel injection valve 32 mounted on one side wall of each throttle body 18 into an intake port of the engine E.

Valve shafts 29a of the throttle valves 29 provided in the four throttle bodies 18 are interlocked with each other, and are operated to open/close the throttle valves 29 by a throttle grip additionally provided on a steering handlebar of the motorcycle 1. The throttle grip opens/closes the throttle valves 29 via a pulley 30 fixed on the outermost valve shaft 29a and an operating wire 31 wound around the pulley 30.

A partition wall 34 for partitioning an intermediate portion of the dirty air chamber 23 into a lower passage 33a and an upper passage 33b is integrally provided on the inner side of the lower case half 22b. The lower passage 33a has a smaller cross-sectional area than the upper passage 33b. The intake control valve 35 for opening/closing the large cross-section passage 33b is rotatably supported by the partition wall 34.

The intake control valve 35 includes a valve plate 36 and a valve shaft 37 integrally provided on one end of the valve plate 36. One bearing 38 for rotatably supporting one end portion of the valve shaft 37 and a pair of right and left bearings 39 for rotatably supporting the other end portion of the valve shaft 37 are provided on the partition wall 34.

The intake control valve 35 is turned between a first intake control position A (see FIG. 2) and a second intake control position B (see phantom lines in FIG. 2). At the first intake control position A, the tip of the valve plate 36 is brought into contact with a ceiling surface of the large cross-section passage 33b (see FIG. 3) to fully close the large cross-section passage 33b. At the second intake control position B, the valve plate 36 is thrown down in parallel to the partition wall 34 to fully open the large cross-section passage 33b. In the example of the intake control valve 35 shown in the figures, the turning angle of the intake control valve 35 between the first and second intake control positions A and B is set at approximately 45°. Additionally, at the second intake control position B of the intake control valve 35, the valve plate 36 is tilted with its tip directed to the upstream side of the large cross-section passage 33b, and the intake negative pressure of the engine E acts to bias the valve plate 36 in the closing direction.

Figure 6:
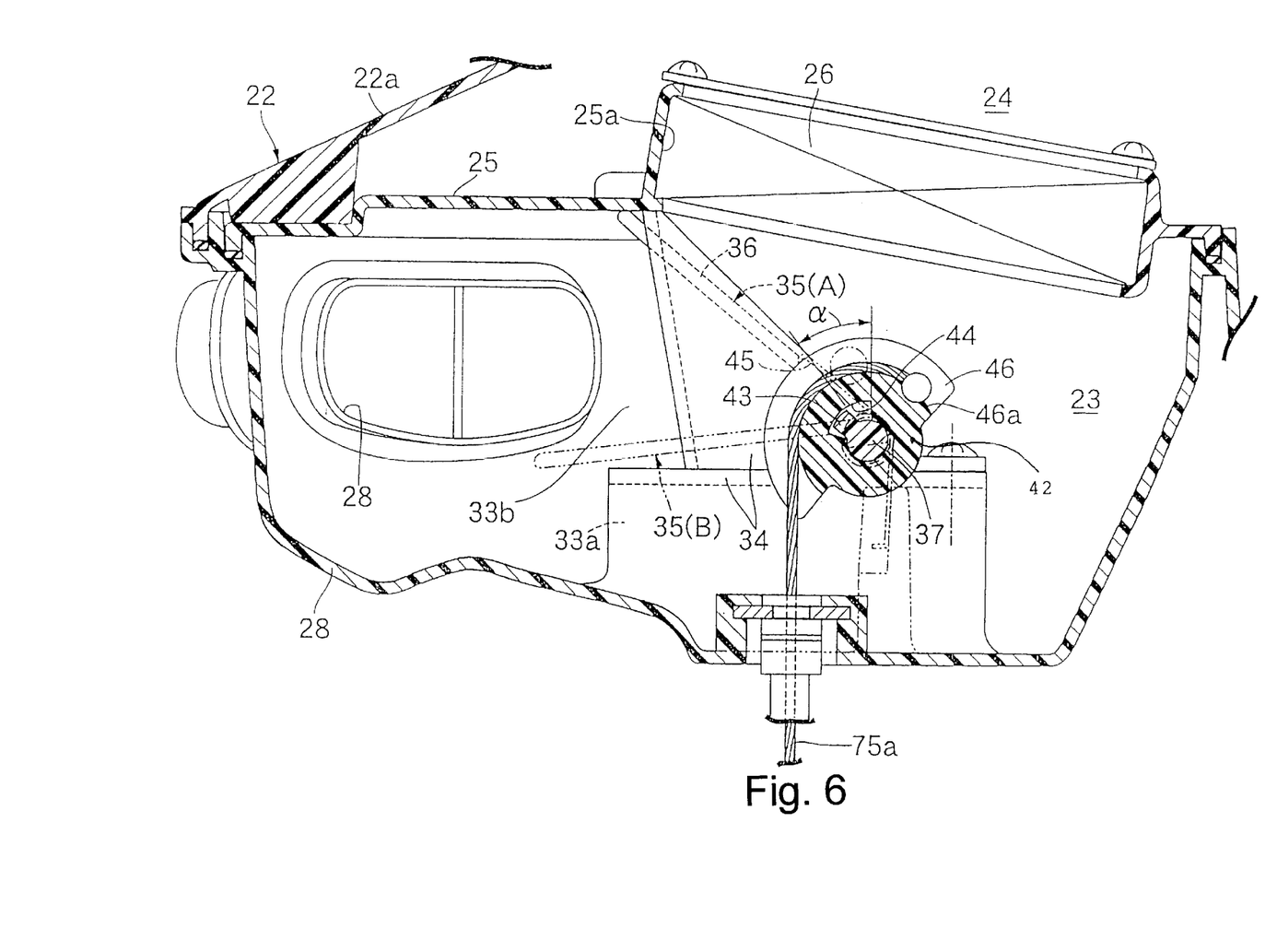
FIG. 6 is a sectional view taken on line 6—6 of FIG. 4.

An arm 40 is integrally formed on a first end portion of the valve shaft 37. A return spring 41 is connected to the arm 40 for biasing the valve plate 36 in the closing direction on the first intake control position A side. A driven pulley 46 is rotatably mounted on a second end portion of the valve shaft 37 at a position between a pair of right and left bearings 39. The driven pulley 46 is connected to a drive pulley 73 of an actuator 71 (which will be described later) via a first transmission wire 75a. A lost motion mechanism 42 for connecting the driven pulley 46 and the valve shaft 37 to each other is provided between the driven pulley 46 and the valve shaft 37.

The lost motion mechanism 42 includes a transmission pin 43 projecting from one side surface of the valve shaft 37, a circular-arc groove 44 formed in the inner peripheral surface of the driven pulley 46 and extending in the circumferential direction to be engaged with the transmission pin 43, and a lost motion spring 45 for biasing the driven pulley 46 on the first intake control position A side of the intake control valve 35. The center angle of the circular-arc groove 44 is set to be larger than the opening/closing angle of the intake control valve 35.

When the driven pulley 46 is turned from the retreated position in the direction of opening the intake control valve 35, i.e. on the second intake control position B side, one end surface of the circular-arc groove 44 is brought into contact with the transmission pin 43 after it is turned by a specific play angle □, to move the intake control valve 35 on the second intake control position B side.

The layout of the small cross-section passage 33a, large cross-section passage 33b, intake control valve 35, and air funnels 21 in the cleaner case 22 are practical and consequently the air cleaner can be made compact and easily disposed over the engine. Next, the exhaust system Ex of the engine E will be described in detail with reference to FIG. 1 and FIGS. 7 to 10.

Figure 7:
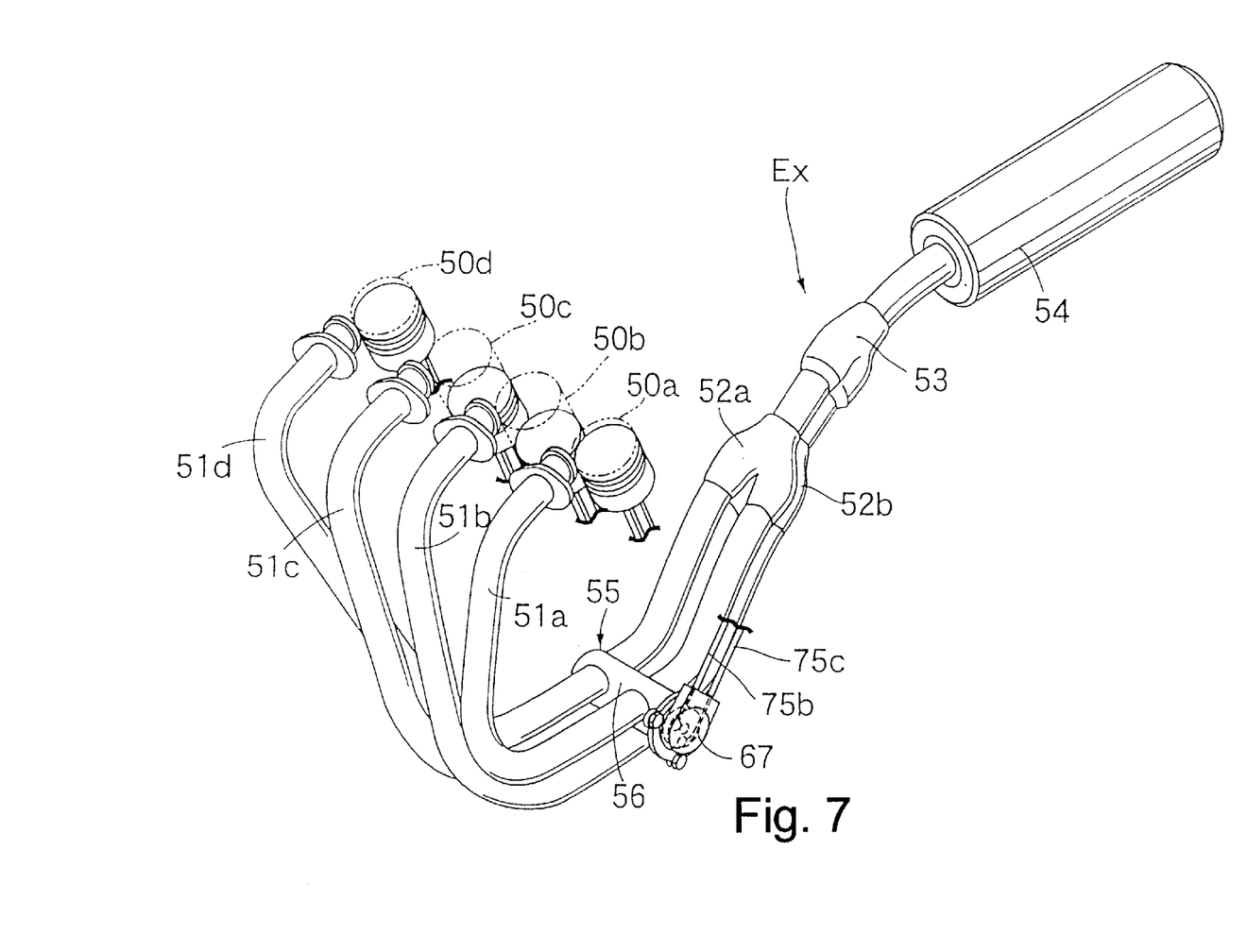
FIG. 7 is a perspective view of an exhaust system.
Figure 8:
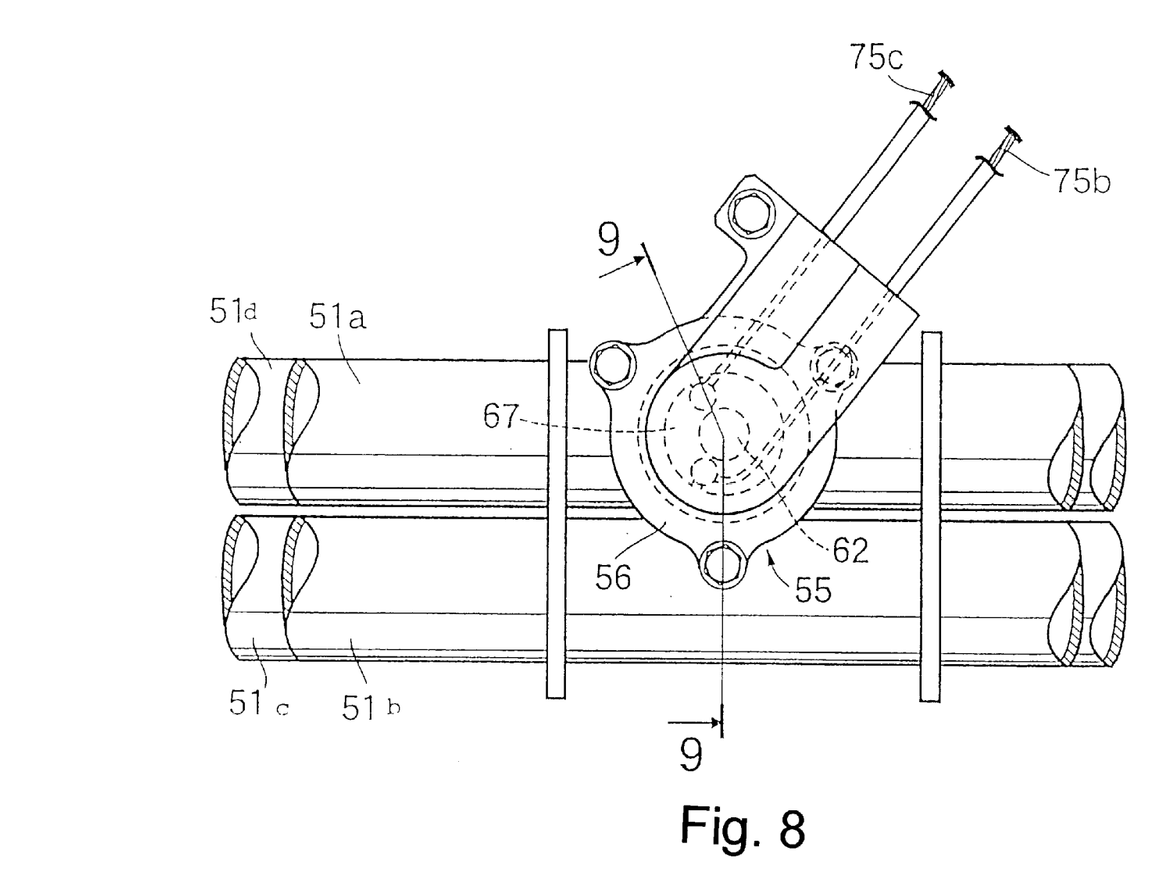
FIG. 8 is a side view of the exhaust control system.

Referring first to FIGS. 1 and 7, the parallel four cylinders 50a to 50d of the engine E are arranged in this order from the left side of the vehicle, and ignition of each cylinder is performed in the order of the first, second, fourth, and third cylinders 50a, 50b, 50d and 50c. The first to fourth exhaust pipes 51a to 51d corresponding to the first to fourth cylinders 50a to 50d are connected to the front surface of the cylinder head 9. These exhaust pipes 51a to 51d extend downwardly along the front surface of the engine E and curve rearwardly under the engine E. The first and fourth exhaust pipes 51a and 51d are adjacently disposed in the lateral direction, and the second and third exhaust pipes 51b and 51c are, directly under the first and fourth exhaust pipes 51a and 51d, adjacently disposed in the lateral direction.

Of these exhaust pipes 51a to 51d having passed under the engine E, the first and fourth exhaust pipes 51a and 51d are connected to an upper first exhaust collection pipe 52a for collecting the first and fourth exhaust pipes 51a and 51d, and the second and third exhaust pipes 51b and 51c are connected to a lower first exhaust collection pipe 52b for collecting the second and third exhaust pipes 51b and 51c. The exhaust collection pipes 52a and 52b are connected to a second exhaust collection pipe 53 for collecting the exhaust collection pipes 52a and 52b, and the exhaust muffler 54 is connected to the rear end of the second exhaust collection pipe 53.

Figure 9:
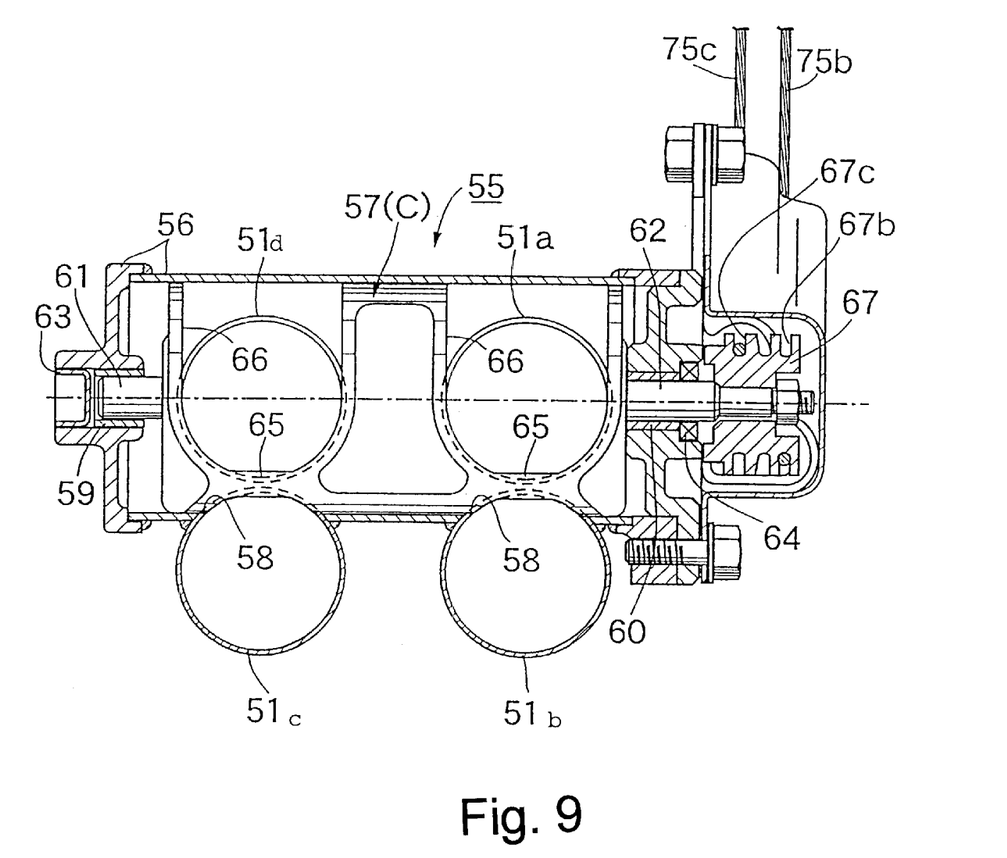
FIG. 9 is a sectional view taken on line 9—9 of FIG. 8.

Under the engine E, a common exhaust control valve 55 is provided to intermediate portions of the first to fourth exhaust pipes 51a to 51d. The exhaust control valve 55 includes a cylindrical valve housing 56 disposed in such a manner as to be perfectly put in the pipe lines of the upper side first and fourth exhaust pipes 51a and 51d and put in the upper portions of the pipe lines of the lower side second and third exhaust pipes 51b and 51c, and a valve body 57 rotatably disposed in the valve housing 56.

The upper portions of the second and third exhaust pipes 51b and 51c have communication holes 58 opened to the valve housing 56. The first to fourth exhaust pipes 51a to 51d are air-tightly welded to the peripheral wall of the valve housing 56.

Bearings 59 and 60 are provided in both end walls of the valve housing 56, and a pair of valve shafts 61 and 62 projecting from both ends of the valve body 57 are rotatably supported by these bearings 59 and 60. The outer end of one bearing 59 is closed with a plug body 63, and a seal member 64 is mounted to the outer end of the other bearing 60.

Figure 10:
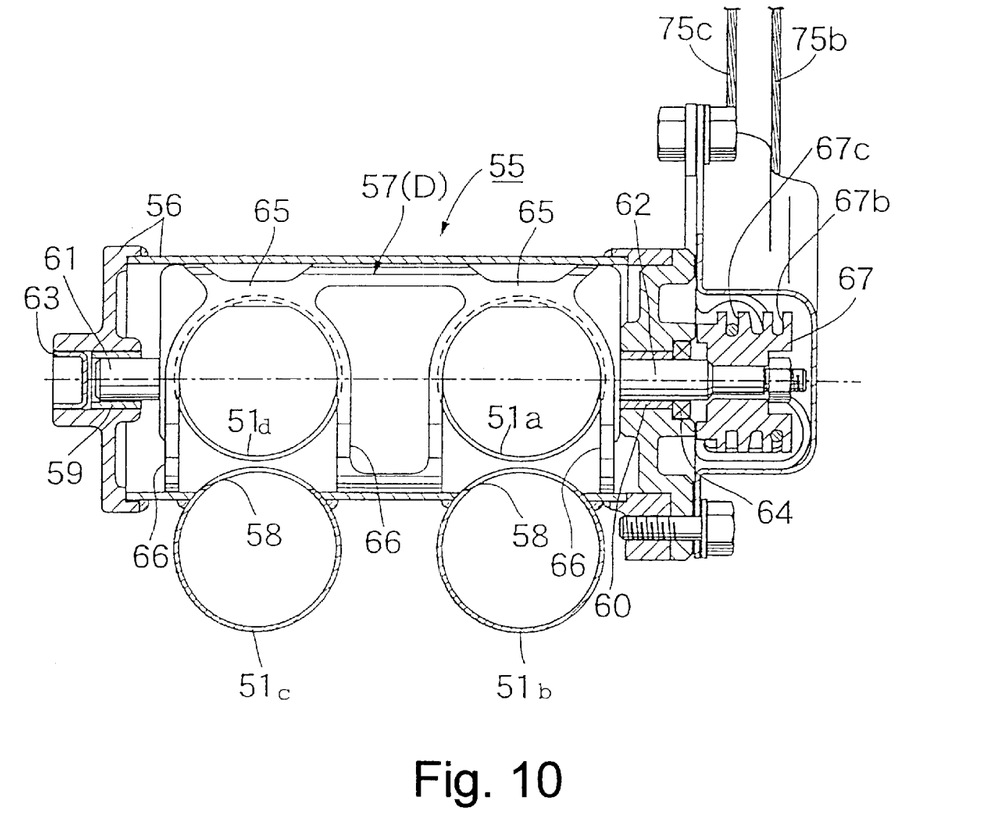
FIG. 10 is a view illustrating the function of the exhaust control system shown in FIG. 9.

The valve body 57 is rotatable approximately 180° between a first exhaust control position C (see FIG. 9) and a second exhaust control position D (see FIG. 10). The valve body 57 has partition walls 65 for closing the communication holes 58 of the second and third exhaust pipes 51b and 51c at the first exhaust control position C, and guiding walls 66 for communicating the first exhaust pipe 51a to the second exhaust pipe 51b and also communicating the fourth exhaust pipe 51d to the third exhaust pipe 51c via the communication holes 58 at the second exhaust control position D.

The valve shaft 62 supported by the bearing 60 passes through the seal member 64 and projects outwardly therefrom. A driven pulley 67, which is driven by a drive pulley 73 of an actuator 71 to be described later via second and third transmission wires 75b, 75c, is fixed to the projecting end portion of the valve shaft 62.

Figure 11:
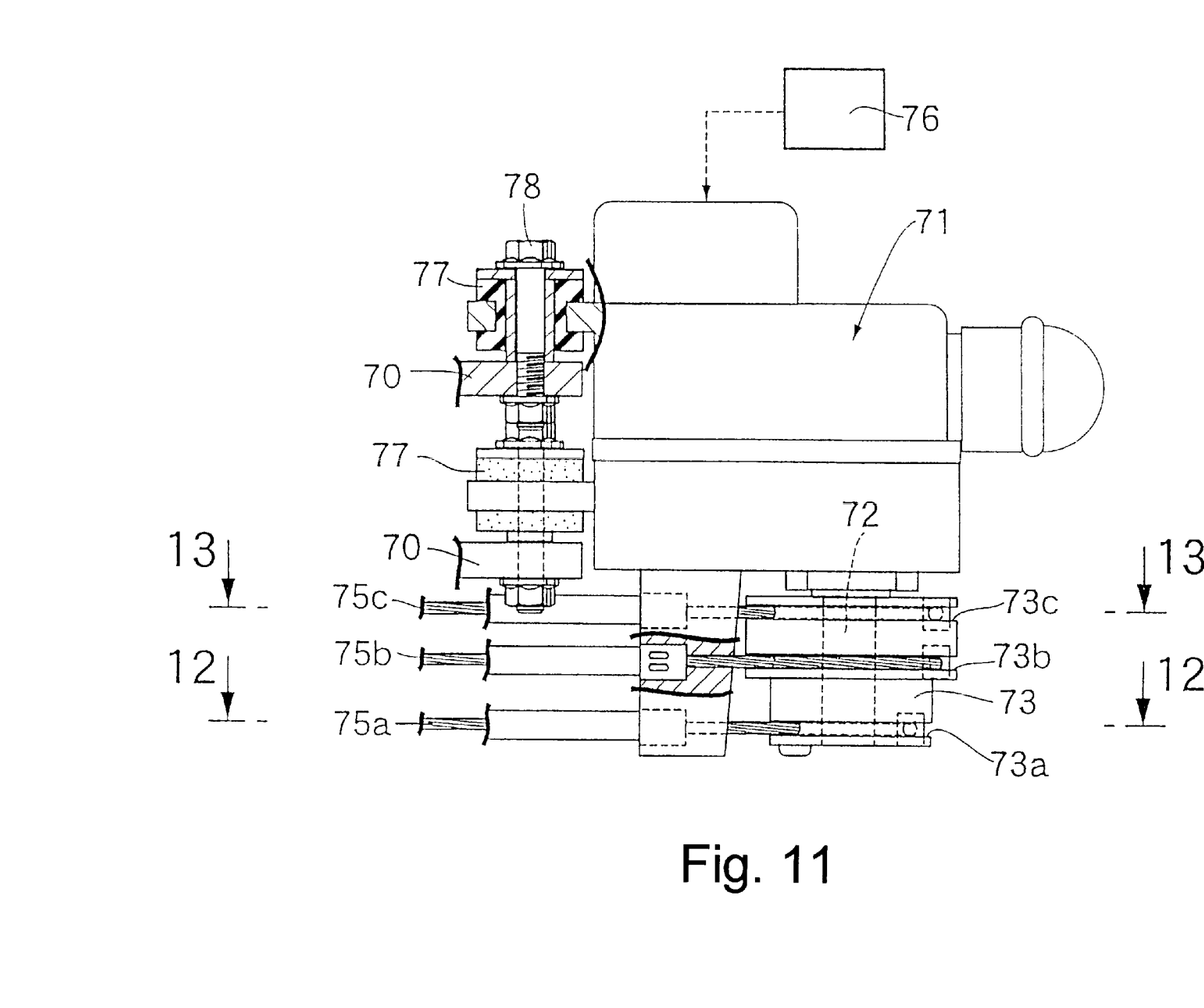
FIG. 11 is a plan view showing a drive system for driving the intake control valve and the exhaust control valve.
Figure 12:
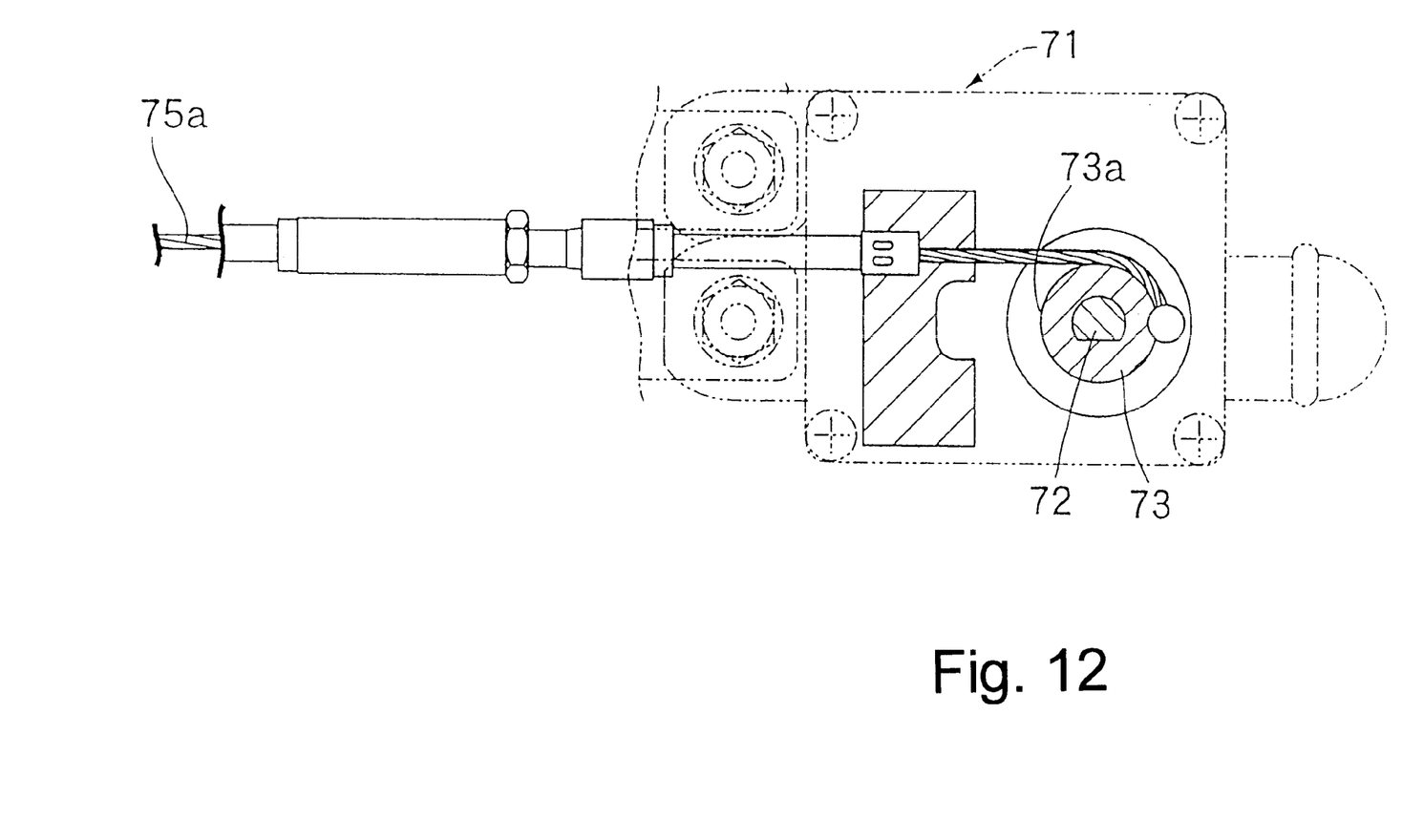
FIG. 12 is a sectional view taken on line 12—12 of FIG. 11.
Figure 13:
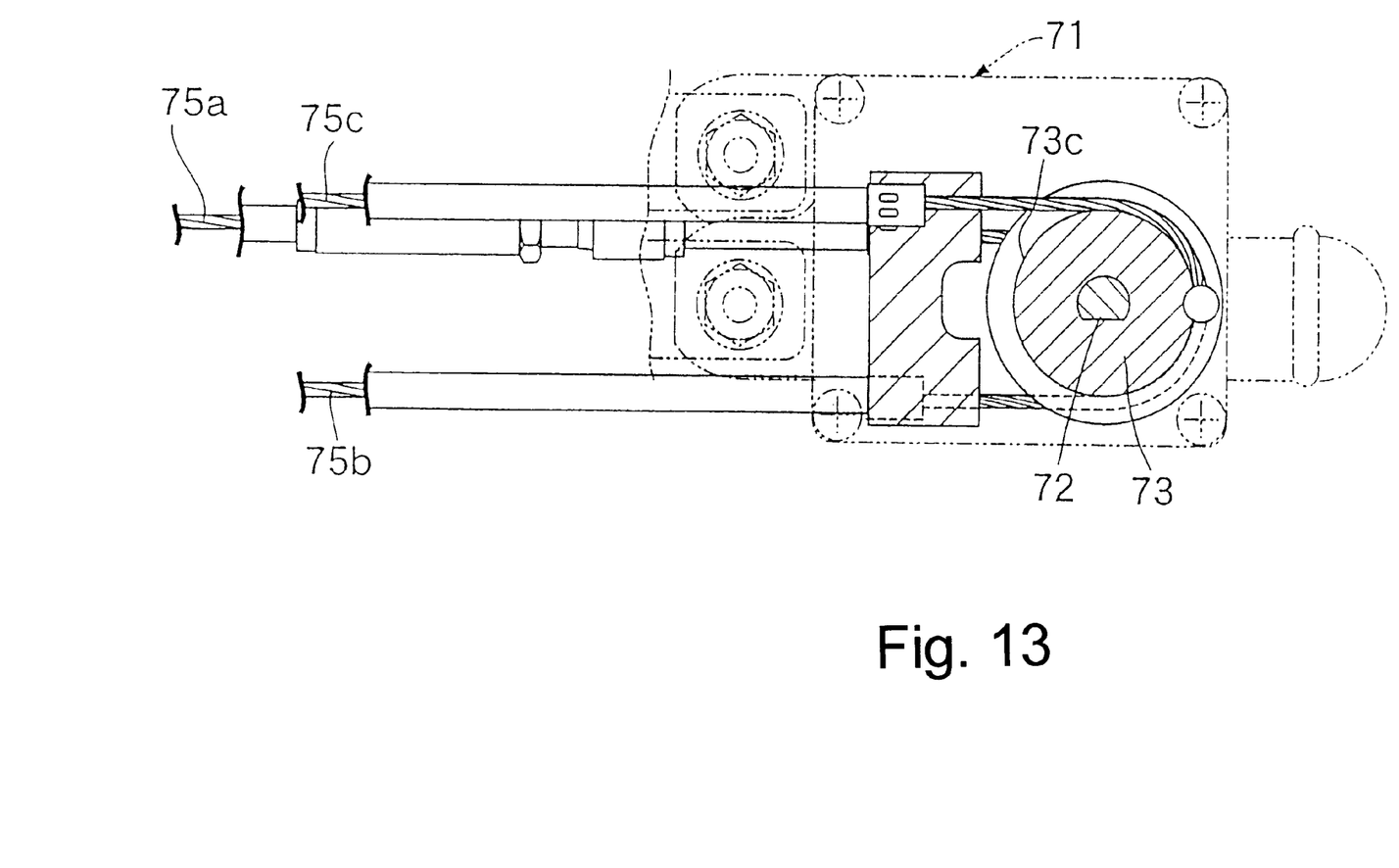
FIG. 13 is a sectional view taken on line 13—13 of FIG. 11.

Next, a drive system for driving the intake control valve 35 and the exhaust control valve 55 will be described with reference to FIG. 1 and FIGS. 11 to 13. Referring to FIGS. 1 and 11, a pair of brackets 70 are fixed on the inner surface of the main frame 4 at a position over the crank case 10 of the engine E, and the common actuator 71 is mounted via an elastic member 77 to the brackets 70 with a bolt 78. In this case, the actuator 71 is disposed such that a distance between the intake control valve 35 and the same is nearly equal to a distance between the exhaust control valve 55 and the same. According to one embodiment, as shown in the figures, the actuator 71 is configured as a normally reversibly rotatable electric motor.

The drive pulley 73 fixed to an output shaft 72 of the motor has a small-diameter first wire groove 73a, and large-diameter second and third wire grooves 73b and 73c. A first transmission wire 75a is engaged in both the first wire groove 73a and a wire groove 46a of the driven pulley 46 (see FIG. 6) on the intake control valve 35 side, and both terminals of the wire 75a are connected to the drive pulley 73 and the driven pulley 46. The second and third transmission wires 75b and 75c are respectively engaged in the second and third wire grooves 73b and 73c and a pair of wire grooves 67b and 67c of the driven pulley 67 (see FIG. 9) on the exhaust control valve 55 side. In this case, the winding direction of the second transmission wire 75b is opposed to that of the third transmission wire 75c. Both terminals of each of the second and third transmission wires 75b and 75c are connected to the drive pulley 73 and the driven pulley 67.

The drive of the actuator 71 is controlled by an electronic control unit 76 to which signals based on the speed of the engine E and the boosted negative pressure are supplied from sensors (not shown). The function of this embodiment will be described below.

In the low speed rotational range of the engine E, the electronic control unit 76 operates the actuator 71 to hold the intake control valve 35 at the first intake control position A and to hold the exhaust control valve 55 at the first exhaust control position C.

When the intake control valve 35 is held at the first intake control position A, as shown in FIG. 2, the large cross-section passage 33b is fully closed with the valve plate 36, so that air sucked in the engine E passes through the air cleaner 17 through the small cross-section passage 33a. Accordingly, even if the increment of fuel injected from the fuel injection valve 32 is retarded when the opening degree of the throttle valve 29 is rapidly increased for rapidly accelerating the rotation of the engine E, the amount of intake air supplied in the engine E is suppressed from being excessively increased by the restriction resistance of the small cross-section passage 33a. As a result, it is possible to supply a suitable rich air-fuel mixture to the engine E, and hence to achieve a good accelerating performance.

On the other hand, when the exhaust control valve 55 is held at the first exhaust control position C, as shown in FIG. 9, the communication holes 58 of the second and third exhaust pipes 51b, 51c are closed by the partition walls 65, so that the effective pipe lengths of the first to fourth exhaust pipes 51a to 51d become the maximum lengths extending from the engine E to the upper and lower first exhaust collection pipes 52a and 52b. The maximum effective pipe length is set such that the exhaust inertia effect and/or exhaust pulsation effect increase the volumetric efficiency of the engine E in the low speed rotational range. In this way, the low speed output performance of the engine E can be enhanced.

In this way, since the intake system In and the exhaust system Ex have functions matched to the low speed operational state, respectively, they can effectively enhance the low speed output performance of the engine E.

When the rotational state of the engine E is shifted to the high speed rotational range, the actuator 71 receives a signal matched to the high speed rotational range from the electronic control unit 76, and normally turns the drive pulley 73. With this normal turn of the drive pulley 73, the first and second transmission wires 75a and 75b are simultaneously pulled and the third transmission wire 75c is loosened. As a result, the driven pulley 46 on the intake control valve 35 side is turned on the second intake control position B side, and the driven pulley 67 on the exhaust control valve 55 side is turned on the second exhaust control position D side. In this case, the latter driven pulley 67, which is integrally connected to the valve shaft 62 of the exhaust control valve 55, immediately turns the valve 55 to the second exhaust control position D.

However, the former driven pulley 46 singly turns by the play angle against the biasing force of the lost motion spring 45 until the transmission pin 43 of the valve shaft 37 comes in contact with one end of the circular-arc groove 44 of the driven pulley 46, and then turns the intake control valve 35 to the second intake control position B against the biasing force of the return spring 41 via the transmission pin 43. In this way, the intake control valve 35 and the exhaust control valve 55 simultaneously reach the second intake control position B and the second exhaust control position D.

Figure 3:
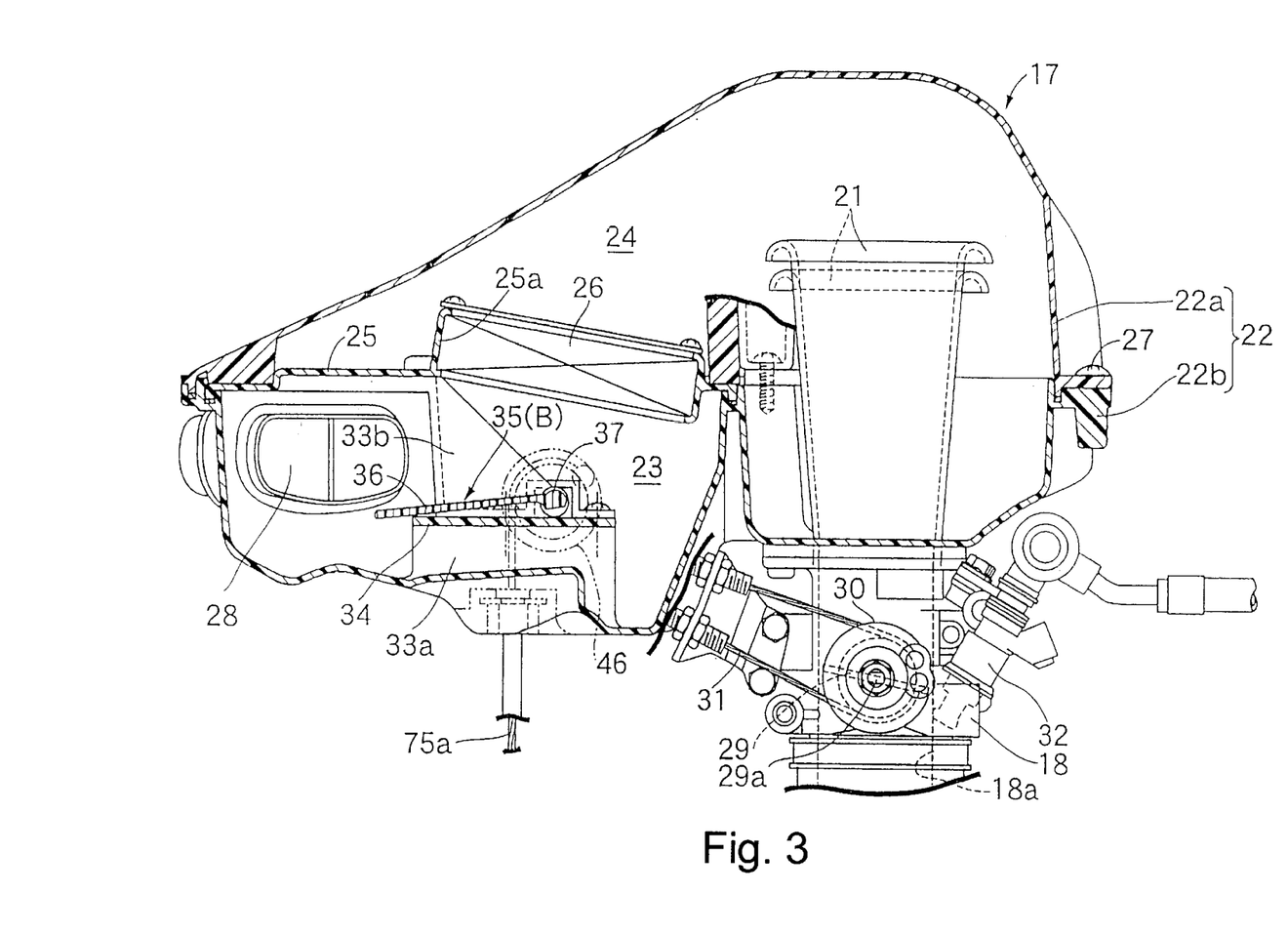
FIG. 3 is a view illustrating the function of the intake control system shown in FIG. 2.

When the intake control valve 35 is positively turned to the second intake control position B by the actuator 71, as shown in FIG. 3, the valve plate 36 fully opens the large cross-section passage 33b, with a result that air sucked in the engine E can fully pass through the air cleaner 17, more concretely, pass through not only the large cross-section passage 33b not obstructed by the valve plate 36 but also the small cross-section passage 33a. Accordingly, it is possible to reduce the intake resistance, and hence to enhance the volumetric efficiency of the engine E and improve the high speed output performance.

On the other hand, when the exhaust control valve 55 is turned to the second exhaust control position D, as shown in FIG. 10, the communication holes 58 are opened, and the first and fourth exhaust pipes 51a and 51d are communicated to the second and third exhaust pipes 51b and 51c by the guiding walls 66, respectively, so that the effective pipe lengths of the first to fourth exhaust pipes 51a to 51d become the minimum lengths extending from the engine E to the exhaust control valve 55. The minimum effective pipe length is set such that the exhaust inertia effect and/or exhaust pulsation effect increase the volumetric efficiency of the engine E in the high speed rotational range. In this way, the high speed output performance of the engine E can be enhanced.

Since the intake system In and the exhaust system Ex have functions matched to the high speed operational state, respectively, they can effectively enhance the high speed output performance of the engine E.

Upon a normal turn of the drive pulley 73 by the actuator 71, as described above, by suitably retarding the starting of the turn of the intake control valve 35 having a small rotational angle to the second intake control position B from the starting of the turn of the exhaust control valve 55 having a large rotational angle to the second exhaust control position D, the intake control valve 35 and the exhaust control valve 55 different in rotational angle can be simultaneously turned to the second intake control position B and the second exhaust control position D by the common actuator 71.

When the engine E is returned to the low speed rotational range again, the actuator 71 reversibly turns the drive pulley 73 to loosen the first and second transmission wires 75a and 75b and pull the third transmission wire 75c. By the loosening of the first transmission wire 75a, the driven pulley 46 is reversibly turned by the biasing force of the lost motion spring 45, and the intake control valve 35 is returned to the first intake control position A by the biasing force of the return spring 41.

The driven pulley 67 is reversibly turned and the exhaust control valve 55 is returned to the first exhaust control position C by the pull of the third transmission wire 75c.

Since the intake control valve 35 and the exhaust control valve 55 are simultaneously turned, the intake control valve 35 having a small rotational angle reaches the first intake control position A before the exhaust control valve 55 is returned to the first exhaust control position C. After that, the driven pulley 46 is continuously reversibly turned while one end wall of the circular-arc groove 44 is separated from the transmission pin 43 of the intake control valve 35, until the exhaust control valve 55 reaches the first exhaust control position C along with the reverse turn of the drive pulley 73.

In this way, even if there is a large difference between the rotational angles of the intake control valve 35 and the exhaust control valve 55, such a difference can be absorbed by the lost motion mechanism 42, so that both the control valves 35 and 55 can be accurately operated by the common actuator 71. As a result, it is possible to simplify the configuration of the drive system for driving both the control valves 35 and 55, and hence to improve the engine performance while reducing the cost of the drive system and further reduce the weight of the drive system.

The present invention is not limited to the above-described embodiments, and it is to be understood that various changes in design may be made without departing from the scope of the present invention. For example, the intake control valve 35 may be configured such that the effective pipe length of the intake system In is variable depending on the operational state of the engine E. The present invention can be applied to intake systems and exhaust systems of single-cylinder engines and multi-cylinder engines.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An intake control system for an engine comprising:
   a plurality of passages disposed in parallel and formed in an air cleaner;
   an intake control valve for opening/closing at least one passage of said plurality of passages is provided in said air cleaner;
   an actuator for closing said intake control valve in a low speed rotational range of said engine and opening said intake control valve in a high speed rotational range of said engine is connected to said intake control valve; and
   a partition wall in said air cleaner for partitioning an intermediate portion of a chamber into a lower passage and an upper passage.

2. The intake control system for an engine according to claim 1, wherein the intake control valve operates to open and close the upper passage.

3. The intake control system for an engine according to claim 1, wherein a cross-sectional area of said upper passage is larger than a cross-sectional area of said lower passage.

4. The intake control system for an engine according to claim 1, wherein the intake control valve includes a valve plate having a one end and a valve shaft integrally provided on the one end of the valve plate.

5. The intake control system for an engine according to claim 4, wherein the valve shaft has a first end portion and a second end portion, the valve shaft having a bearing rotatably supporting the first end portion and a pair of right and left bearings rotatably supporting the second end portion of the valve shaft.

6. The intake control system for an engine according to claim 5, further comprising an arm integrally formed on the first end of the valve shaft;
   a return spring for biasing the valve plate in a closing direction is connected to the arm;
   a driven pulley rotatably mounted on the second end portion of the valve shaft between the pair of right and left bearings; and
   a lost motion mechanism for connecting the driven pulley to the valve shaft.

7. The intake control system for an engine according to claim 6, wherein the lost motion mechanism includes a transmission pin projecting from a side surface of the valve shaft, a circular-arc groove formed in an inner peripheral surface of the driven pulley, and a lost motion spring for biasing the driven pulley on a first intake control position side of the intake control valve.

8. The control system for an engine according to claim 1, wherein a cross-sectional area of said at least one passage of said intake control valve is larger than a cross-sectional area of another passage of said plurality of passages.

9. An intake control system for an engine comprising:
   an air cleaner;
   a plurality of throttle bodies each having an intake passage;
   a plurality of air funnels for connecting to the intake passages of the throttle bodies;
   a cleaner case including a lower case half and an upper case half;
   an element mounting plate for partitioning an inside of the cleaner case into a lower side dirty air chamber and an upper side clean air chamber;
   a cleaner air element mounted in a mounting hole provided in the element mounting plate;
   a partition wall for partitioning the lower side dirty air chamber into a plurality of passages disposed in parallel and formed in an air cleaner; and
   an intake control valve for opening/closing at least one passage of said plurality of passages is provided in said air cleaner, wherein said intake control valve is closed in a low speed rotational range of said engine and opens in a high speed rotational range of said engine.

10. The intake control system for an engine according to claim 9, wherein the intake control valve includes a valve plate having a one end and a valve shaft integrally provided on the one end of the valve plate.

11. The intake control system for an engine according to claim 10, wherein the valve shaft has a first end portion and a second end portion, the valve shaft having a bearing rotatably supporting the first end portion and a pair of right and left bearings rotatably supporting the second end portion of the valve shaft.

12. The intake control system for an engine according to claim 11, further comprising an arm integrally formed on the first end of the valve shaft;
- a return spring for biasing the valve plate in a closing direction is connected to the arm;
- a driven pulley rotatably mounted on the second end portion of the valve shaft between the pair of right and left bearings; and
- a lost motion mechanism for connecting the driven pulley to the valve shaft.

13. The intake control system for an engine according to claim 12, wherein the lost motion mechanism includes a transmission pin projecting from a side surface of the valve shaft, a circular-arc groove formed in an inner peripheral surface of the driven pulley, and a lost motion spring for biasing the driven pulley on a first intake control position side of the intake control valve.

14. The intake control system for an engine according to claim 13, further comprising an actuator for closing said intake control valve in a low speed rotational range of said engine and opening said intake control valve in a high speed rotational range of said engine is connected to said intake control valve.

15. The intake control system according to claim 14, wherein said actuator includes a reversibly rotatable electric motor having an output shaft.

16. The intake control system according to claim 15, wherein a drive pulley is fixed to an end of the output shaft, the drive pulley including at least one wire groove, each wire groove capable of driveably engaging a transmission wire.

17. An engine for mounting on a motorcycle, said engine comprising:
- an electronic control unit;
- at least one combustion chamber;
- a cylinder block;
- a cylinder head;
- an exhaust control system; and
- an intake control system, said intake control system including
  - a throttle body connected to said engine;
  - an air cleaner for cleaning air flowing in an intake passage of said throttle body is disposed on an upper portion of said engine; and said air cleaner includes a cleaner case and a cleaner element for partitioning the inside of said cleaner case into a dirty air chamber in communication with atmospheric air and a clean chamber in communication with said intake passage of said throttle body; said clean chamber disposed in said cleaner case on an upper portion of said dirty air chamber; and an intake control valve;
- a partition wall for partitioning an intermediate portion of said dirty air chamber into a plurality of passages disposed in parallel is provided in said cleaner case, said intake control valve opening and closing at least one passage of said plurality of passages; and
- an actuator for closing said intake control valve in a high speed rotational range of said engine and opening said intake control valve in a high speed rotational range of said engine is connected to said intake control valve; wherein said engine is capable of being mounted on a motorcycle so that said cylinder block and said cylinder head are tilted in a forward direction of the motorcycle.

* * * * *